(12) United States Patent
Tormasov et al.

(10) Patent No.: US 10,951,394 B2
(45) Date of Patent: Mar. 16, 2021

(54) SYSTEM AND METHOD FOR PUBLICATION OF PRIVATE DATA USING A BLOCKCHAIN NETWORK

(71) Applicant: Acronis International GmbH, Schaffhausen (CH)

(72) Inventors: Alexander Tormasov, Moscow (RU); Stanislav Protasov, Moscow (RU); Serguei Beloussov, Costa del Sol (SG)

(73) Assignee: Acronis International GmbH, Schaffhausen (CH)

( * ) Notice: Subject to any disclaimer, the term of this patent is extended or adjusted under 35 U.S.C. 154(b) by 237 days.

(21) Appl. No.: 15/998,403

(22) Filed: Aug. 15, 2018

(65) Prior Publication Data

US 2019/0058580 A1 Feb. 21, 2019

Related U.S. Application Data

(60) Provisional application No. 62/545,529, filed on Aug. 15, 2017.

(51) Int. Cl.
| | |
|---|---|
| *H04L 29/06* | (2006.01) |
| *H04L 9/06* | (2006.01) |
| *H04L 9/00* | (2006.01) |
| *G06F 9/46* | (2006.01) |
| *G06F 16/182* | (2019.01) |
| *H04L 9/32* | (2006.01) |

(52) U.S. Cl.
CPC ............ *H04L 9/0637* (2013.01); *G06F 9/466* (2013.01); *G06F 16/182* (2019.01); *H04L 9/008* (2013.01); *H04L 9/3239* (2013.01); *H04L 63/0407* (2013.01); *H04L 63/0428* (2013.01); *H04L 2209/38* (2013.01)

(58) Field of Classification Search
CPC ..... H04L 9/008; H04L 9/0637; H04L 9/3239; H04L 63/0407; H04L 63/0428; G06F 16/182; G06F 9/466
See application file for complete search history.

(56) References Cited

U.S. PATENT DOCUMENTS

2018/0375750 A1\* 12/2018 Moeller .................. G06F 16/27

\* cited by examiner

*Primary Examiner* — Jeffrey C Pwu
*Assistant Examiner* — Thong P Truong
(74) *Attorney, Agent, or Firm* — Arent Fox LLP; Michael Fainberg

(57) ABSTRACT

A system and method for encrypting and publishing data using blockchain technology is provided. An exemplary method includes receiving, by one or more nodes of a distributed network that maintains a blockchain, a message requesting publication of private information within the blockchain subsequent to a specified time interval. Moreover, the method includes recording a sequence of transactions in the blockchain based on the time interval, wherein each transaction in the sequence of transactions includes a payload calculated using a first homomorphic operation; and extracting the private information from a final payload of a final transaction in the sequence of transactions from the blockchain.

17 Claims, 5 Drawing Sheets

SYSTEM AND METHOD FOR PUBLICATION OF PRIVATE DATA USING A BLOCKCHAIN NETWORK

CROSS-REFERENCE TO RELATED APPLICATIONS

This application claims the benefit of U.S. Provisional Application No. 62/545,529, filed Aug. 15, 2017, which is incorporated by reference herein.

FIELD OF TECHNOLOGY

The present disclosure generally relates to the field of blockchain technology, and more specifically, to devices, systems and methods that allow a user to guarantee the publication of private data to a distributed database or blockchain.

BACKGROUND

Blockchain technology is an emerging technology that has been used in digital currency implementations. The blockchain is a data structure that stores a list of transactions and can be thought of as a distributed electronic ledger that records transactions between a source and a destination. The transactions are batched together into blocks and every block refers back to or is linked to a prior block in the chain. Computer nodes, sometimes referred to as miners, maintain the blockchain and cryptographically validate each new block (and the transactions contained therein) using a proof-of-work system.

While blockchain technology has the potential to offer new benefits, it also poses problems for certain types of transactions. For example, a decentralized transaction ledger might not be suitable for the publication of data used to verify the authenticity of electronic documents. Using some information management systems, parties may contract to transfer encrypted private data from one party to another. Traditionally, a trusted third party can be commissioned to handle the receipt and disbursement of information and documents between parties, analogous to an escrow agent handling money between transacting parties. However, the use of such third parties raises transaction costs, and introduces risks for unauthorized access to private data during transfer of parties. As a result, there exists an additional specific need in the art for information management systems that would allow for the guaranteed publication of encrypted data.

SUMMARY

The present disclosure provides an effective solution to the foregoing problems by providing a secure technique for encrypting and publishing data on a decentralized, distributed computing system. Other advances and contributions to the current state of the art will be further apparent to one of ordinary skill in view of the following description. In particular, the disclosure provides a blockchain system, as well as related systems and methods, which may be used to establish a time-delayed, guaranteed publication of private, encrypted data as described in detail herein.

In a first exemplary aspect, a method for encrypting and publishing data using blockchain technology is provided. In this aspect, the method includes receiving, by one or more nodes of a distributed network that maintains a blockchain, a message requesting publication of private information within the blockchain subsequent to a specified time interval; recording a sequence of transactions in the blockchain based on the time interval, wherein each transaction in the sequence of transactions includes a payload calculated using a first homomorphic operation; and extracting the private information from a final payload of a final transaction in the sequence of transactions from the blockchain.

In some exemplary aspects, each transaction in the sequence of transactions is recorded as a separate block added to the blockchain.

In some exemplary aspects, the specified time interval comprises a specified number of blocks added to the blockchain.

In some exemplary aspects, recording the sequence of transactions in the blockchain based on the time interval comprises determining an initial payload based on an inverse mapping function applied to a first value of a sequence of private data values, wherein the sequence of private data values are selected such that a second homomorphic operation applied to the sequence yields the private information; and recording a first transaction of the sequence of transactions in the blockchain, wherein the first transaction includes the initial payload and a first transaction identifier associated with the first value in the sequence of private data values.

In some exemplary aspects, recording the sequence of transactions in the blockchain based on the time interval further comprises determining a next payload based on a homomorphic operation applied to a prior payload and a result of the inverse mapping function applied to a second value of the sequence of private data values; and recording a second transaction of the sequence of transactions in the blockchain, wherein the second transaction is recorded in a second block subsequent to a first block containing the first transaction, and the second transaction includes the next payload and a second transaction identifier associated with the second value.

In some exemplary aspects, the prior payload comprises the initial payload.

In some exemplary aspects, the homomorphic operation comprises a homomorphic encryption function.

According to another aspect, a non-transitory computer readable medium comprising computer executable instructions for encrypting and publishing data blockchain technology. In this aspect, instructions are included for receiving, by one or more nodes of a distributed network that maintains a blockchain, a message requesting publication of private information within the blockchain subsequent to a specified time interval; recording a sequence of transactions in the blockchain based on the time interval, wherein each transaction in the sequence of transactions includes a payload calculated using a first homomorphic operation; and extracting the private information from a final payload of a final transaction in the sequence of transactions from the blockchain.

The above simplified summary of an exemplary aspect serves to provide a basic understanding of the disclosure. This summary is not an extensive overview of all contemplated aspects, and is intended to neither identify key or critical elements of all aspects nor delineate the scope of any or all aspects of the disclosure. Its sole purpose is to present one or more aspects in a simplified form as a prelude to the more detailed description of the disclosure that follows. To the accomplishment of the foregoing, the one or more aspects of the disclosure include the features described and particularly pointed out in the claims. Moreover, it is understood that the individual limitations of elements of any of the disclosed methods, systems and software products may be combined to generate still further aspects without departing from the spirit of the present disclosure and the inventive concepts described herein.

BRIEF DESCRIPTION OF THE DRAWINGS

The accompanying drawings, which are incorporated into and constitute a part of this specification, illustrate one or more exemplary aspects of the present disclosure and, together with the detailed description, serve to explain their principles and implementations.

DETAILED DESCRIPTION

Figure 1:
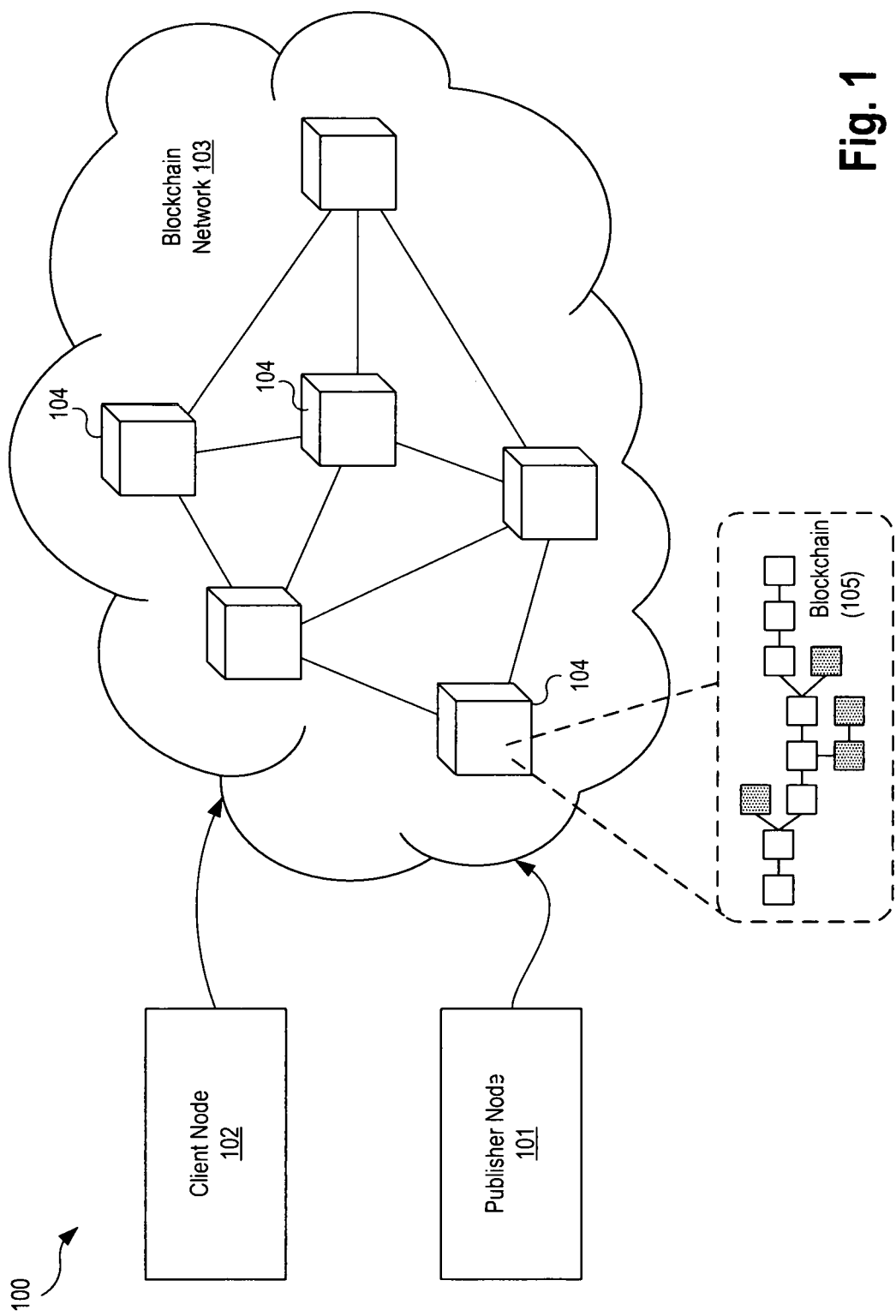
FIG. 1 is a block diagram illustrating a system for encrypting and publishing data using blockchain technology according to an exemplary aspect.

Various aspects are now described with reference to the drawings, wherein like reference numerals are used to refer to like elements throughout. In the following description, for purposes of explanation, numerous specific details are set forth in order to promote a thorough understanding of one or more aspects. It may be evident in some or all instances, however, that any aspect described below can be practiced without adopting the specific design details described below. In other instances, well-known structures and devices are shown in block diagram form in order to facilitate description of one or more aspects. The following presents a simplified summary of one or more aspects in order to provide a basic understanding of the aspects. This summary is not an extensive overview of all contemplated aspects, and is not intended to identify key or critical elements of all aspects nor delineate the scope of any or all aspects.

FIG. 1 is a block diagram illustrating a system for encrypting and publishing data using blockchain technology according to an exemplary aspect. As shown, a system 100 generally includes a publisher node (101), a client node (102), and a blockchain network (103). The publisher node (101) and the client node (102) can generally be considered computer nodes, such as a computer described below with respect to FIG. 5. The publisher node (101) and the client node (102) are configured to communicate and exchange data, directly or via an intermediary, such as the blockchain network (103).

According to an exemplary network, the blockchain network (103) can be an existing (public or private) distributed network formed from a plurality of peer-to-peer nodes (104) or computing devices that collectively maintain a distributed ledger, also referred to as a blockchain 105. The blockchain 105 is a continuously-growing list of data records hardened against tampering and revision and is composed of data structure blocks that hold the data received from other nodes, such as the publisher node (101) and client node (102). The publisher node (101) may transmit data values to the blockchain network (103) encoded in a transaction data structure (and sometimes interchangeably referred to herein as a transaction), and the transaction in the blockchain records blocks and confirms when and in what sequence the data transactions enter and are logged in the existing blockchain. Every node (104) in the decentralized system can have a copy of the growing blockchain 105, avoiding the need to have a centralized ledger managed by a trusted third party. Moreover, each of the nodes (104) can validate the data, add hash values to their copy of the blockchain, and then broadcast these additions to other nodes in accordance with existing blockchain methodologies. It is understood that aspects of the present disclosure may be adapted to use any of a variety of systems for maintaining immutable records or blockchain technologies, (e.g., Bitcoin, Ethereum-based blockchain(s)), or even other distributed ledger technologies, such as virtual consensus algorithms (e.g., Hashgraph).

According to one exemplary aspect, the client node (102) may contract with the publisher node (101) for the guaranteed publication of private data on the blockchain network (103). In some exemplary aspects, the publisher node (101) may be configured to direct the blockchain network (103) to use computationally-intensive homomorphic calculations for the organization of proof-of-work within the blockchain network (103). In some exemplary aspects, the publisher node (101) may be configured to effectively create a "timer" associated with the disclosure, publication, or announcement of the private data after a certain time interval. In some exemplary aspects, the blockchain network (103) may be specifically configured to provide guaranteed publication of private data to the blockchain. In other exemplary aspects, the blockchain network (103) may be a general-purpose blockchain network, such as an Ethereum network, configured to execute scripts or "smart contracts" (e.g., submitted by a publisher node 101) that include executable code for providing guaranteed publication of private data to the blockchain according to aspects of the present disclosure.

In one aspect, the publisher node (101) may be configured to transmit, to one or more nodes 104 of the blockchain network 103, a script for publication of private information within the blockchain 105 subsequent to a specified time interval. Such a script (or smart contract) includes instructions which, when executed by the nodes 104 of the blockchain network 103, cause the nodes 104 to record a sequence of transactions in the blockchain based on the time interval. As described in greater detail below, each transaction in the sequence of transactions includes a payload calculated using a homomorphic operation. Another node, such as another client node 102 may later extract the private information from the blockchain, based on data from a final payload of a final transaction in the sequence of transactions.

Figure 2:
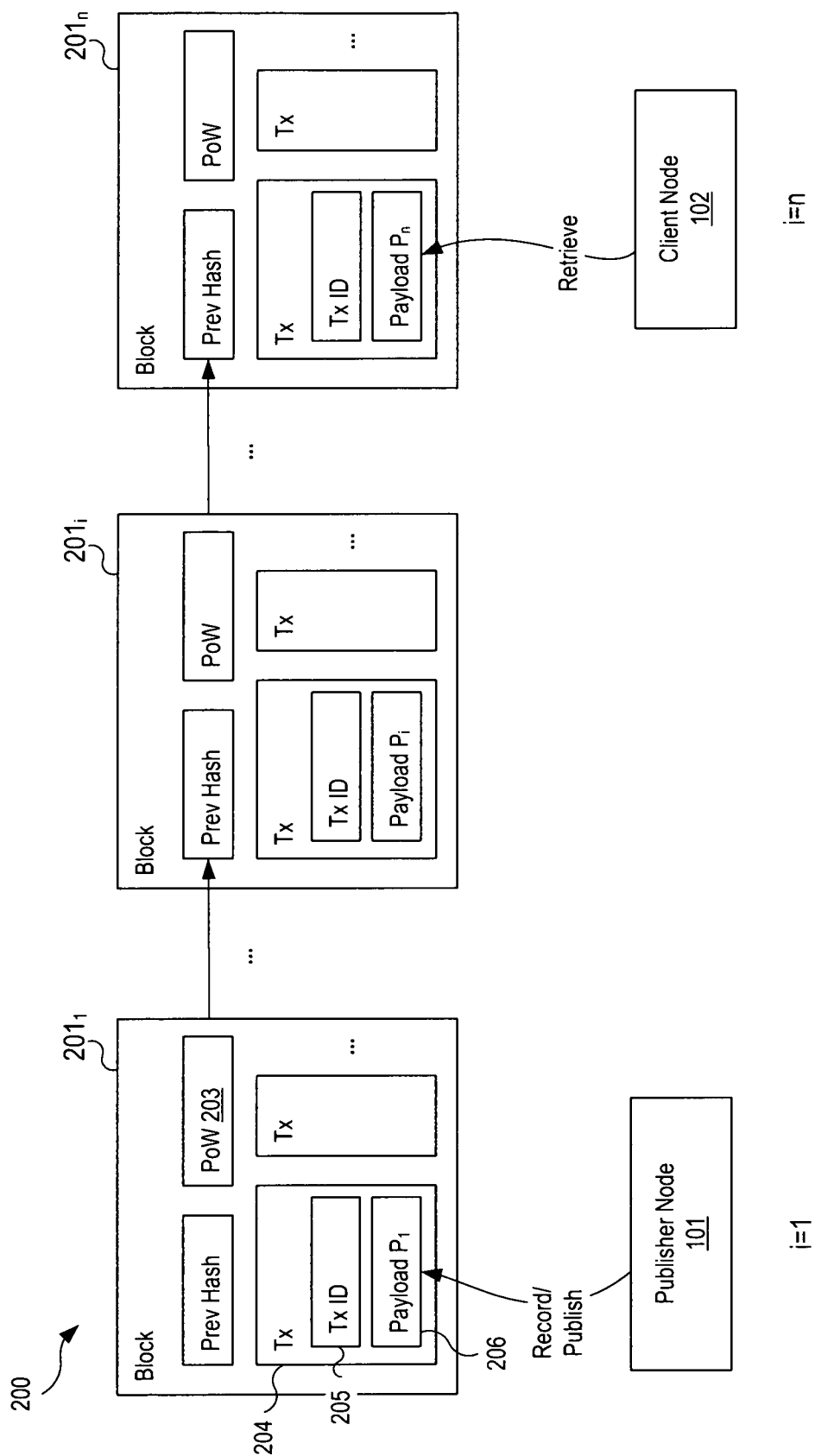
FIG. 2 is a block diagram illustrating a blockchain data structure configured to publish private data according to an exemplary aspect.

FIG. 2 is a block diagram illustrating a blockchain data structure (200) configured to publish private data according to an exemplary aspect. In general, the blockchain data structure (200) (also referred to simply as "blockchain") includes a plurality of cryptographically linked blocks (201) holding batches of valid transactions 204. In one exemplary aspect, each block 201 includes a hash of the prior block in the blockchain (e.g., "previous hash"), linking the two blocks. Each block 201 may further include a proof-of-work field (203) that may be used to validate the block and achieve consensus within the blockchain network (103). In some exemplary aspects, the proof-of-work field (203) may be a simple nonce that yields a hash that begins with a required number of zero bits. Another exemplary aspect of a proof-of-work system for guaranteed publication of private data is described later.

In an aspect, any data including public and private data can be stored in the blockchain. Private data is typically encrypted, but both types of data are inside of the blockchain. For purposes of discussion in the present disclosure, there is a mapping x=H(y) of {y} public data in {x} private data, and a corresponding inverse mapping function y=H$^{-1}$(x). As discussed herein, homomorphic operations refer to operations performed on {y}, thus generating an encrypted result which, when decrypted, matches the result of operations performed on {x}. Let there be homomorphic operations ($h_x$) and ($h_y$) defined in {x} and {y} satisfying the relations shown in Equations (1) and (2) below.

$$x_1(h_x)x_2 = H(H^{-1}(x_1)(h_y)H^{-1}(x_2)) \quad (1)$$

$$H(H^{-1}(x)) = x \quad (2)$$

According to some exemplary aspects, there is some transformation (e.g., hash function) x=f(y, H), which converts the result of homomorphic operations to a certain value in x, which is not correlated with the actual secret value used for homomorphic computations, using only publicly available information, and not the initial secret value).

In the exemplary aspect shown in FIG. 2, a transaction (204) in block (201$_1$) includes a transaction identifier (205) and a payload (206). According to one exemplary aspect, the blockchain (200) may be configured to periodically (e.g., once per round) and in sequential publicly available transactions B(i+1, B(i)) provide a publicly verifiable and readable payload P. A range of non-zero natural numbers n can be specified, and without a loss of generality, consider a sequence of blockchain transactions B(1), B(2, B(1)), . . . B(n, B(n−1)). Although represented as a continuous sequence, it is understood that the sequence of blockchain transactions is not necessarily continuous and may be interrupted by other transactions (associated with other operations, data, users). In one example, at an initial time i=1, in which blockchain (200) includes a publicly available payload P for a first transaction B(1), there exists a Boolean verification function V(T, P), which can tell whether the payload P is in the blockchain transaction T, as in the relation shown in Equation (3).

$$V(B(1),P) = \text{true} \quad (3)$$

Furthermore, an encryption algorithm E and a decryption algorithm D may be specified, transforming the payload $P_T$ to an encrypted state $C_T$ and back using the keys $K_E$ and $K_D$, respectively, as shown in the Equations (4) and (5).

$$C_T = E(P_T, K_E) \quad (4)$$

$$P_T = D(C_T, K_D) \quad (5)$$

Figure 3:
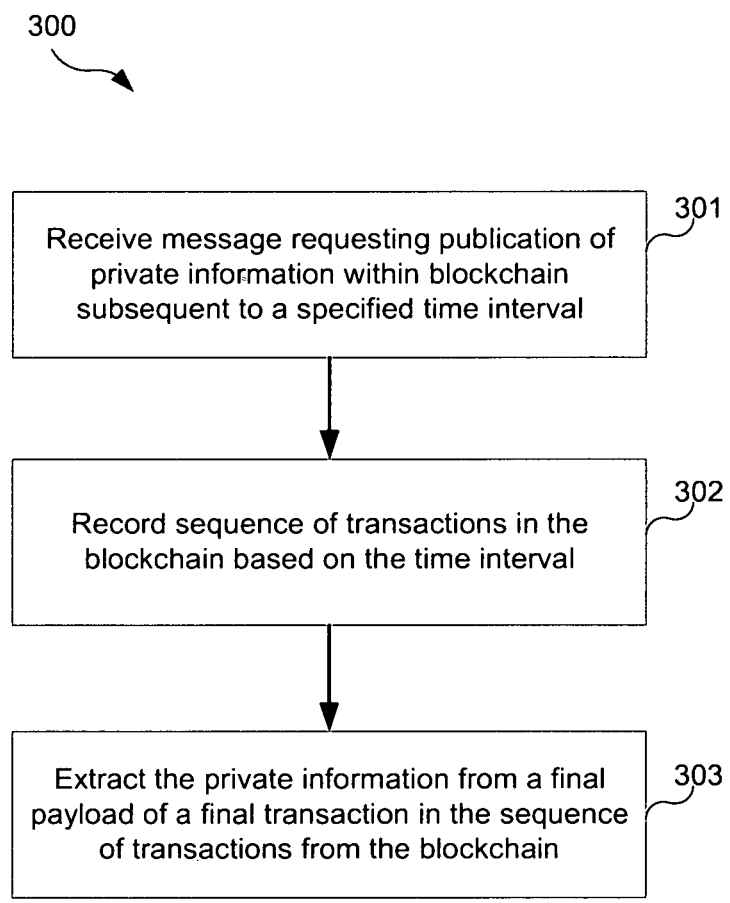
FIG. 3 is a flowchart illustrating an exemplary aspect of a method for encrypting and publishing data according to the present disclosure.

FIG. 3 illustrates a method (300) for encrypting and publishing data according to one exemplary aspect of the disclosure. It should be understood that the method (300) may be performed in conjunction with the system depicted in FIG. 1, or other similar systems. In one exemplary aspect, the method 300 enables a client node (102) to obtain a predetermined value $P_n$ at a time n, and except to publisher node (101), the predetermined value is not known and cannot be computed using public values, but can be guaranteed to be computed or calculated without using the private knowledge that was necessary for its initial generation. In some exemplary aspects, a publisher node (101) can prove its ownership after a time (e.g., change of rounds) n. In some exemplary aspects, the predetermined value $P_n$ may be encrypted form of a secret value S generated by an encryption operation E and an encryption $K_E$:$P_n = E(S, K_E)$.

At step 301, at least one node (104) of a blockchain network (103) that maintains a blockchain (200) receives a message requesting publication of private information within the blockchain (200) subsequent to a specified time interval. In some exemplary aspects, the publication request message may specify the time interval and provide a first data value of a sequence of private data values (e.g., $x_1$).

At step 302, the node (104) of the blockchain network (103) records a sequence of transactions in the blockchain (200) based on the time interval. Each transaction in the sequence of transactions may include a payload calculated using a homomorphic operation, such as a homomorphic encryption function. In some exemplary aspects, each transaction in the sequence of transactions is recorded as a separate block (or in a separate block) added to the blockchain. One exemplary aspect for recording a sequence of transactions in the blockchain are described below in relation to FIG. 4.

At step 303, the node (104) extracts the private information from a final payload of a final transaction in the sequence of transactions from the blockchain. In one exemplary aspect, responsive to a retrieval request from the client node (102) upon expiry of the predetermined time interval, the node (104) provides the extracted private information to the client node (102). That is, on the n step, the resulting value $P_n$, which is what is required to be published. As such, exemplary aspects of the present disclosure are guaranteed to disclose only (after n steps) a certain secret, and if necessary, aspects can prove that there is someone (e.g., client node 102) who requested this secret.

In some aspects, the extracted private information may include forecasts, predicted information (e.g., stock market information), voting results. Aspects of the present disclosure enable such information to remain unknown before a designated moment in time, while ensuring that these results are not tampered with or falsified until that designated moment of publication. In other aspects, the private information published to the blockchain using the described technique may include wagers, bets, the results of competitions, the results of a draw (e.g., lottery). In another aspect, the private information published to the blockchain may include legal documents, such as a legal will or testament for a user, which is published during the user's lifetime. Aspects of the present disclosure ensure that the contents of the will or testament remain sealed until the estate enters probate, for example. In another aspects, the described technique may be performed to store user data (e.g., emails) in the blockchain according to a data retention policy.

Figure 4:
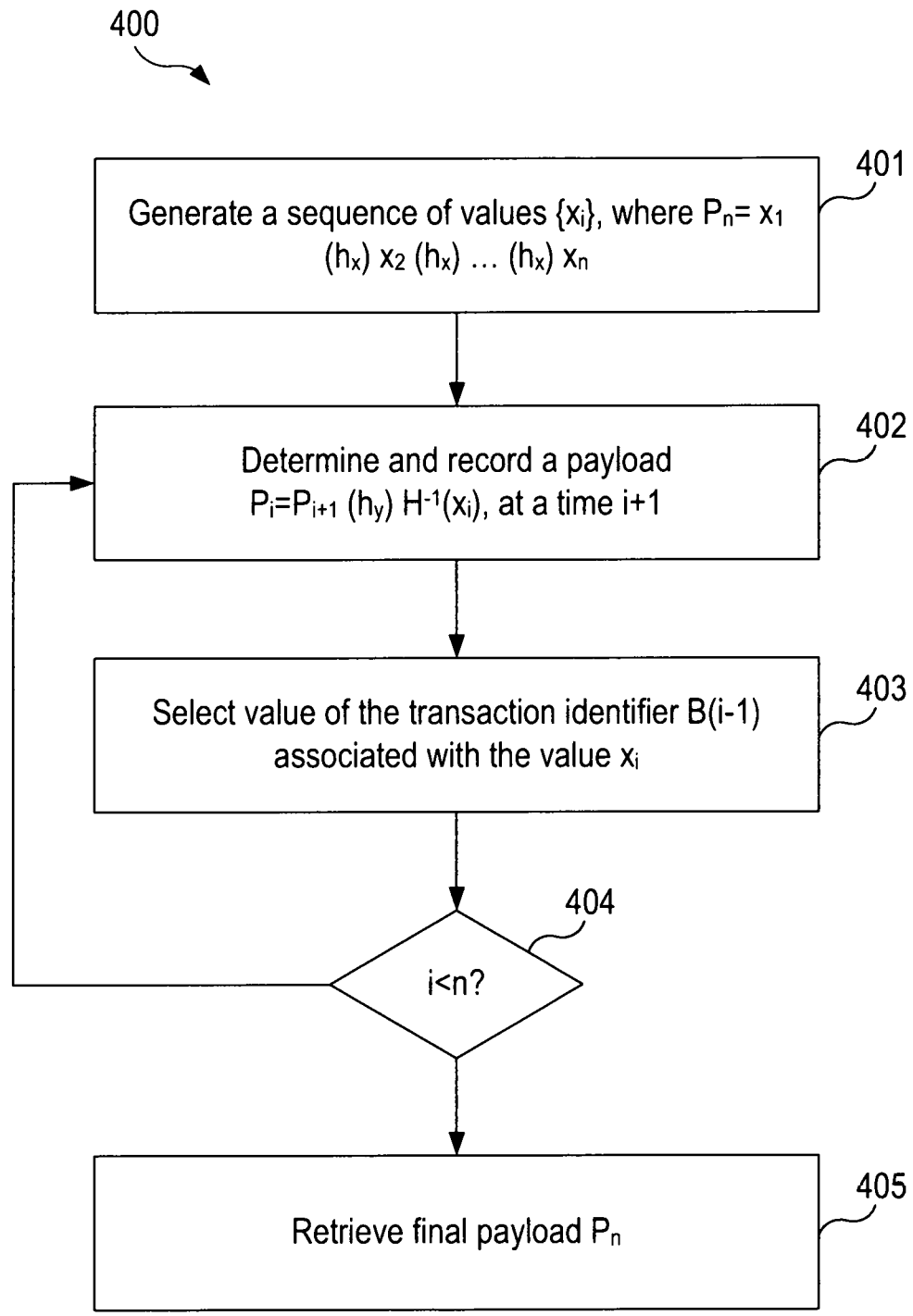
FIG. 4 is a flowchart illustrating an exemplary aspect of a method for encrypting and publishing data according to the present disclosure.

FIG. 4 illustrates a method (400) for recording a sequence of transactions in a blockchain according to one exemplary aspect of the disclosure. At step 401, a node (104) in a blockchain network (103) may generate a sequence of private data values that are selected such that a homomorphic operation applied to the sequence yield the desired private information. For example, in one exemplary aspect, the node (104) may generate a sequence of private data values {$x_i$}, i=1 . . . n such that the homomorphic operation ($h_x$) applied to the sequence {$x_i$} yields the private information $P_n$, as represented by the relation in Equation (6).

$$P_n = x_1(h_x)x_2(h_x) \ldots (h_x)x_n \quad (6)$$

In some exemplary aspects, the sequence of private data values may be generated using a pseudo-random number generator which calculates a next value from the previous value in each step.

At step 402, for a given round, the node (104) determines and records a payload based on a homomorphic operation applied to a prior payload and a result of an inverse mapping function applied to a next value of the sequence of private data values. The node may record a transaction in the blockchain having the calculated payload and a transaction identifier associated with the next value. For example, in some exemplary aspects, the node may calculate, at a time i, a payload $P_i$ using the homomorphic operation ($h_y$), as shown in the relation represented in Equation (7) and record the payload $P_i$ into the blockchain at time i+1.

$$P_i = P_{i-1}(h_y) H^{-1}(x_i) \quad (7)$$

For an initial payload $P_1$, the node may determine the initial payload based on an inverse mapping function applied to a first value in the sequence of private data values. For example, in some exemplary aspects, the node may calculate at time i=1, the initial payload $P_1$ according to the relation represented in Equation (8).

$$P_1 = H^{-1}(x_1) \quad (8)$$

Accordingly, Equation (9) depicts the relation that yields the private information $P_n$ at a given time interval n.

$$\begin{aligned} P_n &= x_1(h_x) x_2(h_x) \ldots (h_x) x_n \quad (9) \\ &= H(H^{-1}(x_1)(h_y) H^{-1}(x_2(h_x) \ldots (h_x) x_n) \\ &= H(H^{-1}(x_1)(h_y) H^{-1}(x_2)(h_y) H^{-1}(x_3(h_x) \ldots (h_x) x_n) \\ &= H(H^{-1}(x_1)(h_y) H^{-1}(x_2)(h_y) \ldots H^{-1}(x_n)) \end{aligned}$$

At step 403, the node may select a transaction identifier associated with the current value from the sequence of private data values as the transfer identifier for the transaction recorded in step 402. For example, in some exemplary aspects, the node selects the value $x_i$ as the transaction identifier B(i−1), which can appear at the moment of recording of a block into a blockchain for all i, except for a last round (i!=N). In one aspect, each block is a transaction.

At step 404, the node may determine whether the specified time interval for the publication of the private information has elapsed (e.g., i<n). For example, in some exemplary aspects, the node may check whether a particular number of rounds of transactions have been recorded. Responsive to determining that the specified time interval has not yet elapsed, the node may repeat steps 402 and 403 for a next round i+1 using a next value $x_{i+1}$. Responsive to determining that the specified time interval has been reached, the node may retrieve the final payload $P_n$ from the blockchain. In one aspect, the client node 102 may retrieve the final information from the blockchain block payload $P_n$.

According to one exemplary aspect, it is understood that, at the time n, it is possible to disclose the value $P_n$ by setting, at the initial moment, the signature for the data, which is used to obtain this value directly:

$$P_n = E(S, K_E) \quad (10)$$

As described earlier, the S signifies the secret value S generated by an encryption operation E and an encryption $K_E$. It is noted that the node can obtain the publicly available result $H^{-1}(P_n)$ for which it is possible to calculate the relation shown in Equation (11), which will be a publicly disclosed secret:

$$Y = f(H^{-1}(P_n), H) \quad (11)$$

In some exemplary aspects, methods according to the disclosure may be further modified to include any of the additional components and steps described herein in the description of devices and systems provided herein. Such modifications are readily understood in light of the present disclosure.

According to some exemplary aspects of the present disclosure, the blockchain network 103 may be configured to maintain a blockchain 200 having a special calculation for a proof-of-work system. For sake of discussion, for calculating a predetermined value of a hash function for a given payload $P_g$ and a variable payload $P_v$, a certain value $B(P_g, P_v)$ can be calculated using a predetermined irreversible algorithm $B(P_g, P_v) = F(P_g \| P_v)$ with some predefined condition and Boolean function of its evaluation S (a, b), which for a predetermined constant $C_i$ is performed according to Equation (12)

$$S(B(P_g, P_v), C_i) == \text{true} \quad (12)$$

In this form, a common task of the principle of calculating blockchain transactions, where the evaluation function simply "cuts off" a few bytes, which, after the conversion of the combination of the given and variable payloads through an algorithm F (e.g., some form of hashing), gives a constant value Ci (e.g., a pre-known serial number of the transaction or transaction sequence number). Therefore, the main task of a blockchain miner (e.g., node 104) is the selection of a variable payload (without changing the predetermined value as it is actually the posted information) so that the result would be a pre-defined hash(or rather, its predetermined part) would be obtained. The computational complexity of the problem is determined by the impossibility of a simple reversal of a hash function to obtain such a given hash from which it will give a predetermined value.

According to some exemplary aspects, let F be a homomorphic encryption algorithm and the computational complexity of the inverse tasks corresponding to the task of obtaining a predetermined value of the encrypted given data (or rather a portion thereof), that is, F(y)=H(y). Let the operation ($\|x$) of combining a given payload and a variable payload be homomorphic for F (with the homomorphic operation $\|y$).

$$x_1(\|_x) x_2 = H(H^{-1}(x_1) (\|_y) H^{-1}(x_2)) \quad (13)$$

$$H(H^{-1}(x)) = x \quad (14)$$

Let $P_{gh} = H(P_g)$ and $P_{vh} = H(P_v)$
$P_g = H^{-1}(P_{gh})$ and $P_v = H^{-1}(P_{vh})$ $$\begin{aligned} S(B(P_g, P_v), C_i) &= S(F(P_g(\|_x) P_v), C_i) \quad (15) \\ &= S(H(P_g(\|_x) P_v), C_i) \\ &= S(H(H^{-1}(P_{gh})(\|_y) H^{-1}(P_{vh})), C_i) \\ &= S(P_{gh}(\|_x) P_{vh}, C_i) \end{aligned}$$

Accordingly, as illustrated in Equations (13)-(15), having done homomorphic encryption for $P_g$, a node in a blockchain network may know the result in advance. That is, a node may be configured to pre-calculate the transaction identifier (complete or partial) by setting the value in the form of numbers and calculating the inverse operation.

In one exemplary aspect, the homomorphic encryption may include a homomorphic concatenation operation, such as the operation S (x, mv)=!((x AND m) XOR v), where x is the value of the length L (the size after the homomorphic operation), m is a bit mask of the valid for the predetermined portion of the transaction identifier bit, and v is the required portion in a transaction value of these bits, and ||x is the concatenation of the two numbers a and b (the length of the half $C_i$=cd). Taking as a and b, respectively, the result of the homomorphic encryption $P_g$ and $P_v$, it may be attempted to separate the tasks of determining the return value for the $P_v$ and the direct value of encryption $P_v$. It should be noted that the bit concatenation operation in a double-sized field GF (2) can be decomposed into a series of shifts (e.g., multiplications by 2) and the OR operation for adding the result. That is, the concatenation of a and b, in considering the two are predetermined in the field GF($2^n$), is defined in the field GF($2^{2n}$) and will appear as (a OR (b×$2^n$)), where x is an arithmetic multiplication operation (not Boolean operation). It is noted that the inversion of this operation can be equivalent to the "scrapping" of homomorphic encryption, i.e., the selection of the value of the result of homomorphic encryption by a direct key.

Figure 5:
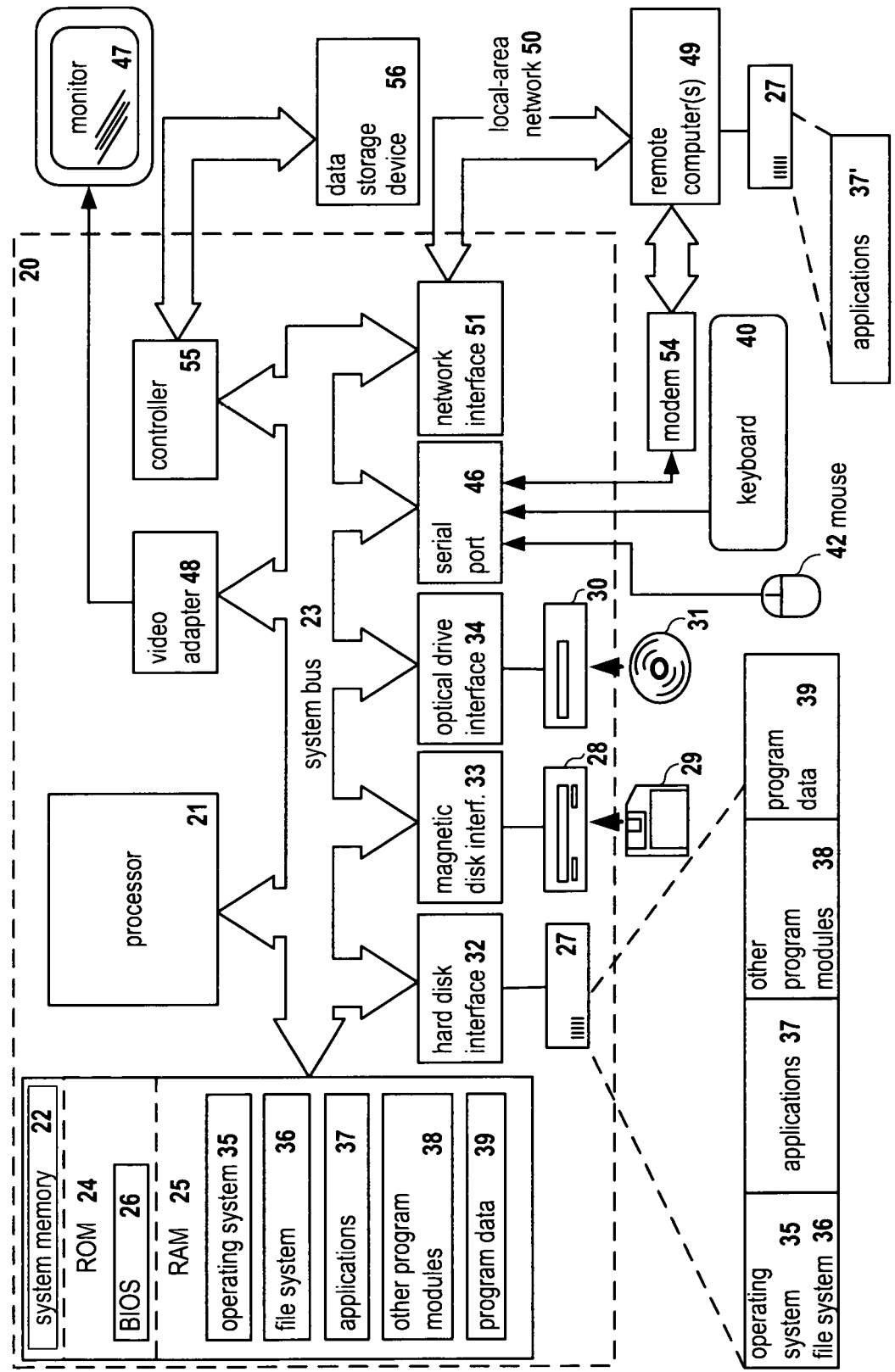
FIG. 5 illustrates an example of a general-purpose computer system with which the disclosed systems and methods (e.g., the exemplary aspects illustrated by FIGS. 1-4) can be implemented.

Finally, FIG. 5 illustrates an example of a general-purpose computer system (which may be a personal computer or a server) with which the disclosed systems and methods can be implemented according to some exemplary aspects. It should be appreciated that the detailed general-purpose computer system can correspond to the client node (102), publisher node (101), or the nodes (104) of the blockchain network described above with respect to FIG. 1.

As shown in FIG. 5, the computer system 20 includes a central processing unit 21, a system memory 22 and a system bus 23 connecting the various system components, including the memory associated with the central processing unit 21. The system bus 23 is realized like any bus structure known from the prior art, including in turn a bus memory or bus memory controller, a peripheral bus and a local bus, which is able to interact with any other bus architecture. The system memory includes read only memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is kept, and also additional program applications 37, other program modules 38 and program data 39. The user is able to enter commands and information into the personal computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to operate within a network environment, using a network connection to one or more remote computers 49. The remote computer (or computers) 49 are also personal computers or servers having the majority or all of the aforementioned elements in describing the nature of a personal computer 20, as shown in FIG. 5. Other devices can also be present in the computer network, such as routers, network stations, peer devices or other network nodes.

Network connections can form a local-area computer network (LAN) 50, such as a wired and/or wireless network, and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules, such as Bluetooth.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted as by one of ordinary skill in the art in light of the teachings and guidance presented herein. Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method for encrypting and publishing data, comprising:
receiving, by one or more nodes of a distributed network that maintains a blockchain, a message requesting publication of private information within the blockchain subsequent to a specified time interval;
recording a sequence of transactions in the blockchain based on the time interval, wherein each transaction in the sequence of transactions includes a payload calculated using a first homomorphic operation, wherein the recording further comprises:
determining an initial payload based on an inverse mapping function applied to a first value of a sequence of private data values, wherein the sequence of private data values are selected such that a second homomorphic operation applied to the sequence of private data values yields the private information; and
recording a first transaction of the sequence of transactions in the blockchain, wherein the first transaction includes the initial payload and a first transaction identifier associated with the first value in the sequence of private data values;
extracting the private information from a final payload of a final transaction in the sequence of transactions from the blockchain; and
providing the extracted private information to a client node in response to determining that the specified time interval has expired.

2. The method for encrypting and publishing data of claim 1, wherein each transaction in the sequence of transactions is recorded as a separate block added to the blockchain.

3. The method for encrypting and publishing data of claim 1, wherein the specified time interval comprises a specified number of blocks added to the blockchain.

4. The method for encrypting and publishing data of claim 1, wherein recording the sequence of transactions in the blockchain based on the time interval further comprises:
determining a next payload based on a homomorphic operation applied to a prior payload and a result of the inverse mapping function applied to a second value of the sequence of private data values;
recording a second transaction of the sequence of transactions in the blockchain, wherein the second transaction is recorded in a second block subsequent to a first block containing the first transaction, and the second transaction includes the next payload and a second transaction identifier associated with the second value.

5. The method for encrypting and publishing data of claim 4, wherein the prior payload comprises the initial payload.

6. The method for encrypting and publishing data of claim 1, wherein the homomorphic operation comprises a homomorphic encryption function.

7. A system for encrypting and publishing data, comprising:
a distributed network of nodes configured to collectively maintain a distributed ledger, wherein each node comprises a hardware processor configured to:
receive a message requesting publication of private information within the distributed ledger subsequent to a specified time interval;
record a sequence of transactions in the distributed ledger based on the time interval, wherein each transaction in the sequence of transactions includes a payload calculated using a first homomorphic operation, wherein the hardware processor is configured to record by:
determining an initial payload based on an inverse mapping function applied to a first value of a sequence of private data values, wherein the sequence of private data values are selected such that a second homomorphic operation applied to the sequence of private data values yields the private information; and
recording a first transaction of the sequence of transactions in the distributed ledger, wherein the first transaction includes the initial payload and a first transaction identifier associated with the first value in the sequence of private data values;
extract the private information from a final payload of a final transaction in the sequence of transactions from the distributed ledger; and
provide the extracted private information to a client node in response to determining that the specified time interval has expired.

8. The system of claim 7, wherein each transaction in the sequence of transactions is recorded as a separate block added to the distributed ledger.

9. The system of claim 7, wherein the specified time interval comprises a specified number of blocks added to the distributed ledger.

10. The system of claim 7, wherein the processor configured to record the sequence of transactions in the distributed ledger based on the time interval is further configured to:
determine a next payload based on a homomorphic operation applied to a prior payload and a result of the inverse mapping function applied to a second value of the sequence of private data values;
record a second transaction of the sequence of transactions in the distributed ledger, wherein the second transaction is recorded in a second block subsequent to a first block containing the first transaction, and the second transaction includes the next payload and a second transaction identifier associated with the second value.

11. The system of claim 10, wherein the prior payload comprises the initial payload.

12. The system for encrypting and publishing data of claim 7, wherein the homomorphic operation comprises a homomorphic encryption function.

13. A non-transitory computer readable medium comprising computer executable instructions for encrypting and publishing data, including instructions for:
receiving, by one or more nodes of a distributed network that maintains a blockchain, a message requesting publication of private information within the blockchain subsequent to a specified time interval;
recording a sequence of transactions in the blockchain based on the time interval, wherein each transaction in the sequence of transactions includes a payload calculated using a first homomorphic operation, wherein instructions for recording further comprises instructions for:
- determining an initial payload based on an inverse mapping function applied to a first value of a sequence of private data values, wherein the sequence of private data values are selected such that a second homomorphic operation applied to the sequence of private data values yields the private information; and
- recording a first transaction of the sequence of transactions in the blockchain, wherein the first transaction includes the initial payload and a first transaction identifier associated with the first value in the sequence of private data values;

extracting the private information from a final payload of a final transaction in the sequence of transactions from the blockchain; and providing the extracted private information to a client node in response to determining that the specified time interval has expired.

14. The non-transitory computer readable medium of claim 13, wherein each transaction in the sequence of transactions is recorded as a separate block added to the blockchain.

15. The non-transitory computer readable medium of claim 13, wherein the specified time interval comprises a specified number of blocks added to the blockchain.

16. The non-transitory computer readable medium of claim 13, wherein the instructions for recording the sequence of transactions in the blockchain based on the time interval further comprises instructions for:

- determining a next payload based on a homomorphic operation applied to a prior payload and a result of the inverse mapping function applied to a second value of the sequence of private data values; and
- recording a second transaction of the sequence of transactions in the blockchain, wherein the second transaction is recorded in a second block subsequent to a first block containing the first transaction, and the second transaction includes the next payload and a second transaction identifier associated with the second value.

17. The non-transitory computer readable medium of claim 16, wherein the prior payload comprises the initial payload.

* * * * *